United States Patent
Lundh et al.

(10) Patent No.: US 7,120,782 B2
(45) Date of Patent: Oct. 10, 2006

(54) METHODS, SYSTEMS AND COMPUTER PROGRAM PRODUCTS FOR ACCESSING DESCRIPTIVE INFORMATION ASSOCIATED WITH A TDMA/GSM SWITCH

(75) Inventors: Anders Lundh, Durham, NC (US); Piroz Darai, Raleigh, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 808 days.

(21) Appl. No.: 10/050,628

(22) Filed: Jan. 16, 2002

(65) Prior Publication Data

US 2003/0133419 A1    Jul. 17, 2003

(51) Int. Cl.
*G06F 7/38*    (2006.01)
*G05B 11/01*    (2006.01)
*G05B 19/42*    (2006.01)
*H04M 3/00*    (2006.01)

(52) U.S. Cl. .......................... 712/227; 700/26; 700/86; 455/418

(58) Field of Classification Search ................ 709/250, 709/224, 225; 455/406, 508; 370/261, 32.01
See application file for complete search history.

(56) References Cited

U.S. PATENT DOCUMENTS

| | | | | |
|---|---|---|---|---|
| 5,479,477 A | * | 12/1995 | McVey et al. | 455/508 |
| 5,659,604 A | * | 8/1997 | Beckmann | 379/32.01 |
| 6,389,279 B1 | * | 5/2002 | Calabrese et al. | 455/417 |
| 6,421,324 B1 | * | 7/2002 | Boyle et al. | 370/261 |
| 6,580,953 B1 | * | 6/2003 | Wiebe et al. | 700/86 |
| 6,704,563 B1 | * | 3/2004 | Senn et al. | 455/406 |

* cited by examiner

*Primary Examiner*—Wen-Tai Lin

(57) ABSTRACT

Accessing descriptive information associated with a TDMA/GSM switch having an adjunct processor is provided. At least a portion of a database of descriptive information is incorporated with data provided to the adjunct processor to control the TDMA/GSM switch. The adjunct processor is accessed to access the TDMA/GSM switch and to access the portion of the database of descriptive information incorporated with the data provided to the adjunct processor. The portion of the database incorporated with the data provided to the adjunct processor may be selected based on the data provided to the adjunct processor to control the TDMA/GSM switch.

20 Claims, 4 Drawing Sheets

METHODS, SYSTEMS AND COMPUTER PROGRAM PRODUCTS FOR ACCESSING DESCRIPTIVE INFORMATION ASSOCIATED WITH A TDMA/GSM SWITCH

BACKGROUND OF THE INVENTION

The present invention relates to the field of communications in general and more particularly to Time Division Multiple Access and/or Global System for Mobile communications (TDMA/GSM) switches.

FIG. 1 illustrates a conventional system for accessing descriptive materials associated with a TDMA/GSM switch 10 utilizing the Active Library Explorer service (ALEXserv) 30. As illustrated in FIG. 1, the TDMA/GSM switch 10 is accessed through an adjunct processor (AP) 12. The AP 12 provides data (often referred to as a "dump") to the switch 10 for operation of the switch 10 and provides access to the switch 10 for service, maintenance, reporting and the like. The dump is loaded onto the AP 12 and then installed on the switch 10. Access to the switch 10 and/or the AP 12 is conventionally provided by a terminal 14 connecting to the AP 12, either directly or remotely through, for example, the network 20. The network 20 may, for example, be the Internet, an intranet, a local area network (LAN), a wide area network (WAN) or the like.

Typically, the terminal 14 sends commands to the switch 10 through a Unix Wiol window. The commands recognized by the switch 10 and their format are, typically, dependent on the data (i.e. the dump) loaded on the AP 12 that is provided to the switch 10. Thus, the particular commands utilized to access and/or control the switch 10 and/or the format of data output by the switch, such as the format of reports or the like, is, typically, dependent on the dump provided to the AP 12. Accordingly, a technician at the terminal 14 will, generally, need to know the designation of the dump provided to the AP 12 from which the formats of particular commands and/or outputs of the switch 10 may be determined.

If a technician does not know a format for a particular command or output, such format may be looked up through the terminal 14 using a help/documentation system known as the ALEXserv 30 system. ALEXserv 30 includes a plurality of databases 32, 32', 32'', 32''' and 32'''' that are help and/or documentation databases associated with the different data (i.e. dumps) provided to a switch, such as switch 10. While five databases are illustrated in FIG. 1, ALEXserv 30 typically includes many more databases, even hundreds of databases, each associated with a particular function, code level or the like of a dump provided to one or more adjunct processors, such as AP 12.

The ALEXserv 30, conventionally, is accessed over an intranet and is provided as a web based application where a web browser is utilized to select the appropriate databases to search for a particular piece of information. The user, typically, utilizes knowledge of the dump provided to a particular AP 12 to select a database and/or databases that contain information associated with a particular switch 10. Thus, to locate information for a particular switch 10, a switch technician will, typically, have to open a web connection, for example, over the network 20', to the ALEXserv 30 and start the ALEXserv application locally. The connection from the terminal 14 to the ALEXserv 30 will, typically, be an intranet connection or the like. Furthermore, the network 20 may be the same network as the network 20' or they may be different networks.

While the conventional system illustrated in FIG. 1 may provide access to documentation and/or help information through the ALEXserv 30, to do so the terminal 14 must, typically, have access to a network which may provide a connection to the ALEXserv 30. Such a connection may not always be available, for example, at a customer site. Alternatively, the technician would, typically, need to download the ALEXserv databases 32–32'''' to the terminal 14 and execute the ALEXserv application locally. While such a download may overcome the need for a connection to the ALEXserv service 30, the technician may still be required to know which of the databases are associated with a particular switch 10 being operated from the terminal 14. Furthermore, access to the switch 10 and the ALEXserv 30 may be provided by separate connections and/or applications and the technician may, in such cases, have to switch between the applications and/or connections to access the switch 10 and the ALEXserv 30.

SUMMARY OF THE INVENTION

Embodiments of the present invention provide methods, systems and computer program products for accessing descriptive information associated with a TDMA/GSM switch having an adjunct processor. At least a portion of a database of descriptive information is incorporated with data provided to the adjunct processor to control the TDMA/GSM switch. The adjunct processor is accessed to access the TDMA/GSM switch and to access the portion of the database of descriptive information incorporated with the data provided to the adjunct processor. The portion of the database incorporated with the data provided to the adjunct processor may be selected based on the data provided to the adjunct processor to control the TDMA/GSM switch.

DETAILED DESCRIPTION

Figure 1:
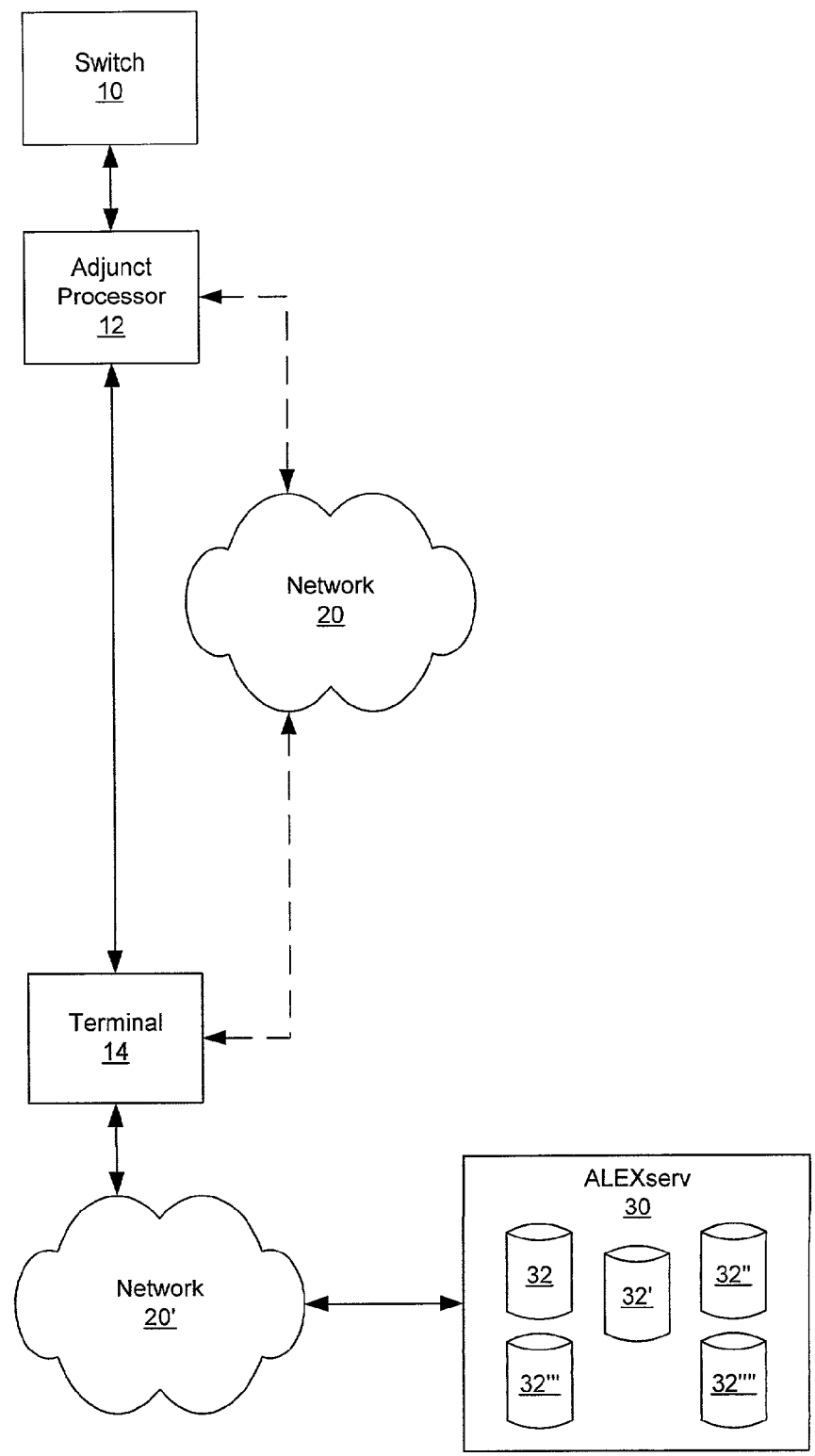
FIG. 1 is a block diagram of a conventional system for accessing descriptive information associated with a TDMA/GSM switch utilizing the ALEXServ system.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects, all generally referred to herein as a "circuit." Furthermore, the present invention may take the form of a computer program product on a computer-usable storage medium having computer-usable program code means embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block and/or flow diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block and/or flow diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

Embodiments of the present invention provide for accessing descriptive information associated with a TDMA/GSM switch utilizing the adjunct processor (AP) associated with the switch. As used herein, "descriptive information" refers to help information, manuals, and/or documentation and the like. Such descriptive information may be accessed directly through the AP by selectively providing to the AP a database and/or databases of descriptive information associated with the dump provided to the AP for the switch associated with the AP. A user may access both the switch and the descriptive information associated with the switch by connecting to the AP. Furthermore, as used herein, the term TDMA/GSM switch refers to a GSM switch and/or another type of TDMA switch.

Figure 2:
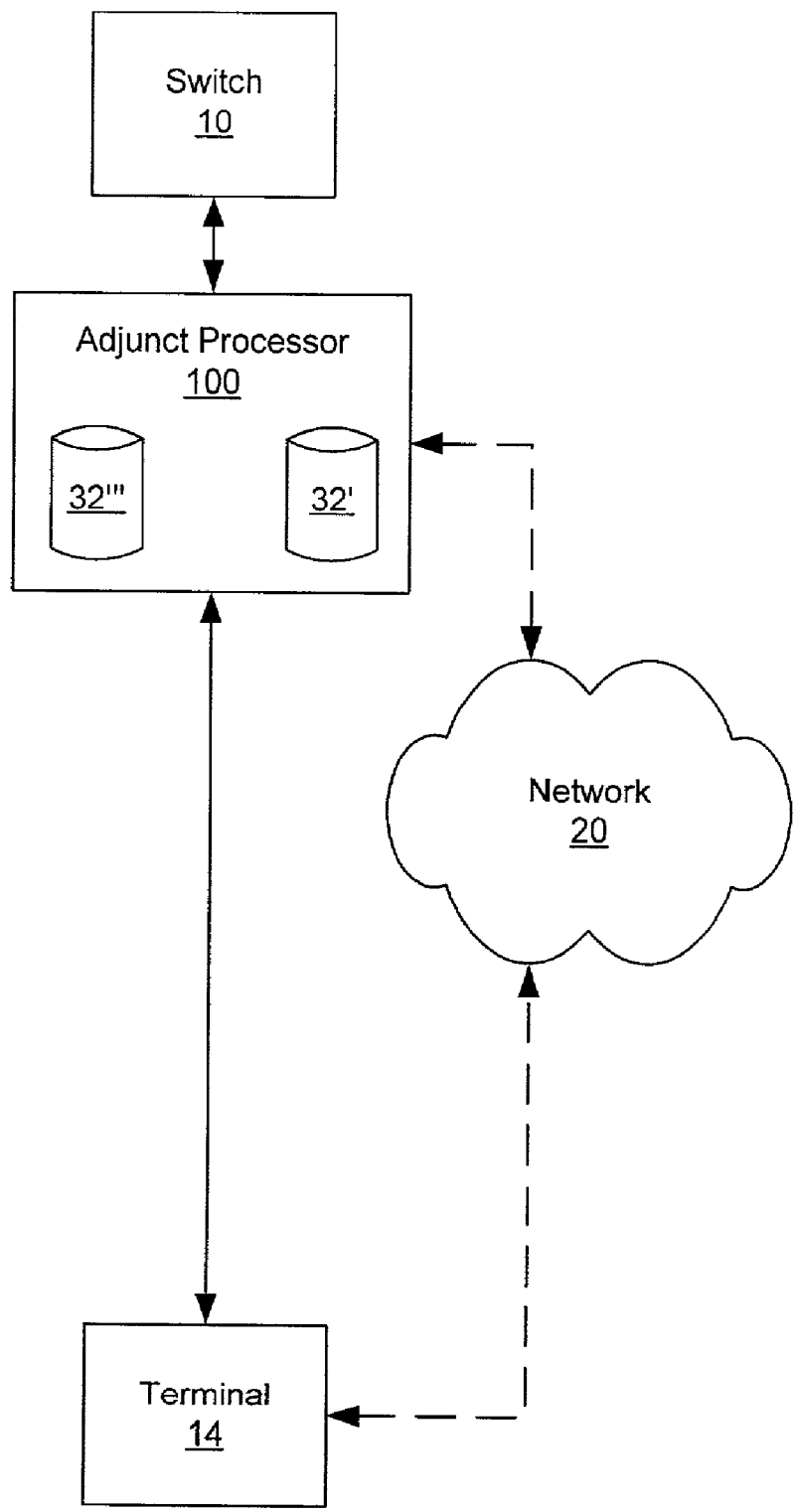
FIG. 2 is a block diagram of a system for accessing descriptive information associated with a TDMA/GSM switch according to embodiments of the present invention.

FIG. 2 illustrates a system for accessing descriptive materials associated with a TDMA/GSM switch 10 according to embodiments of the present invention. As illustrated in FIG. 2, the TDMA/GSM switch 10 is accessed through an adjunct processor (AP) 100. The AP 100 provides data (referred to as a "dump") to the switch 10 for operation of the switch 10 and provides access to the switch 10 for service, maintenance, reporting and the like. This access may be provided by a terminal 14 connecting to the AP 100, either directly or remotely through, for example, a network 20. The network 20 may, for example, be the Internet, an Intranet, a LAN, a WAN or the like.

The terminal 14 sends commands to the switch 10 through, for example, a Unix Wiol window. The commands and their format may be dependent on the data (i.e. the dump) loaded on the AP 100 which is provided to the switch 10. Thus, the particular commands utilized to access and/or control the switch 10 and/or the format of data output by the switch, such as the format of reports or the like, is, typically, dependent on the dump provided to the AP 100.

As is further illustrated in FIG. 2, the AP 100 has incorporated into the data loaded onto the AP 100 (e.g. the dump), descriptive information databases 32' and 32'" which correspond to the dump provided to the AP 100. Such databases may be conventional ALEXserv databases which are incorporated into the dump and provided to the AP 100 as part of the dump. These databases 32' and 32'" may be selected based on the particular dump provided to the AP 100 such that searches of the databases 32' and 32'" will provide descriptive information associated with the particular dump provided to the AP 100 for the switch 10. Such searches may be performed by the terminal 14 accessing the AP 100 either directly or through the network 20.

While all of the ALEXserv databases could be incorporated into each dump provided to the AP 100, preferably, only those databases associated with the particular dump are provided to the AP 100. Such databases may include a central functions commands database (often referred to as an APZ database in ALEXserv) and a database for base station and switch commands (often referred to as an APT database in ALEXserv). By providing only selected databases for the corresponding dump, searches of the databases loaded onto the AP 100 itself may be sufficient to provide the corresponding information for a given dump without requiring the user of the terminal 14 to know the specifics of either the dump to the AP 100 or which databases are associated with the dump.

Preferably, the searches of the databases 32' and 32'" loaded onto the AP 100 are initiated by inputting commands to the same window, such as a Wiol window, as provides access to the switch 10. Unix commands may, for example, be utilized to access the databases 32' and 32'". For example, scripts could be constructed such that a "COD" command, followed by the search term entered on a command line in the Wiol window, could search for a code description corresponding to the search term. Similarly, scripts could be constructed such that a "POD" command, followed by the search term entered on a command line in the Wiol window, could search for a printout description corresponding to the search term. An application information search could be provided by the command "API" followed by a search term. Development of scripts and searches of databases in general are well known in the Unix environment and, therefore, development of suitable scripts and searches will not be described further herein.

Through the use of a single window with command line initiated searches, a user of the terminal 14 need not switch between applications and/or connections to access both the switch 10 and the descriptive information provided by the databases 32' and 32'''. Both accesses may be accomplished through the same window, for example, with the user only needing to exit a session with the switch 10 and resume a session with the AP 100 to access the databases 32' and 32''' or vice versa. While a command line command in the same window as allows access to the switch 10 may be preferred, other interfaces, such as a graphic user interface, to the databases 32' and 32''' may also be provided.

Figure 3:
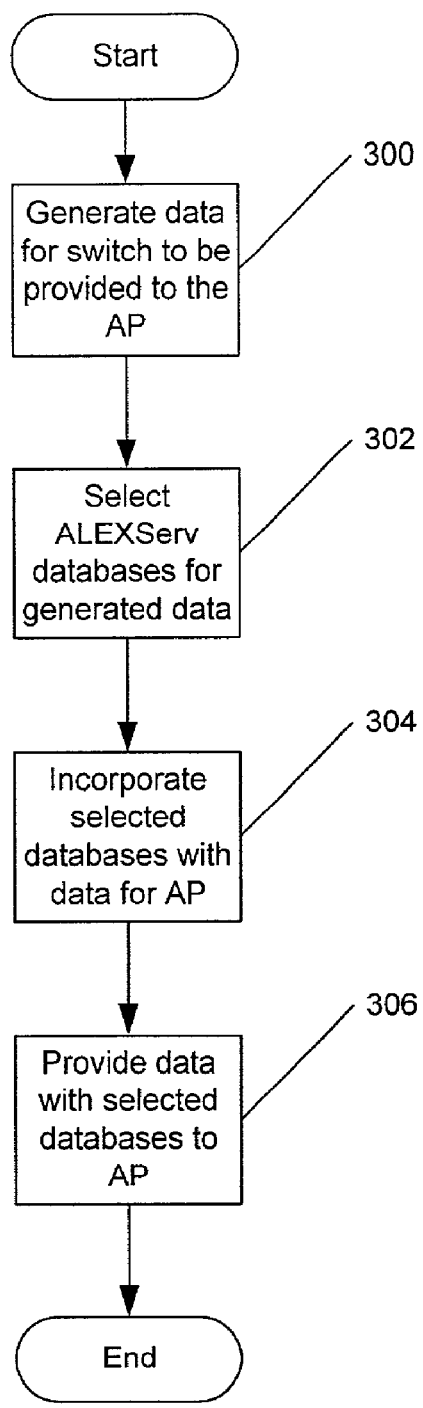
FIG. 3 is a flowchart illustrating operations according to embodiments of the present invention.

FIG. 3 illustrates operations for incorporating descriptive information into data provided to the AP 100 according to embodiments of the present invention. As seen in FIG. 3, the data for the switch 10 which is provided to the AP 100 is generated (e.g. the dump) (block 300). The appropriate ALEXserv databases associated with the generated data for the switch 10 are selected (block 302) and the selected databases are incorporated with the generated data provided to the AP 100 (block 304). The generated data and the incorporated databases are provided to the AP 100 (block 306) such that the incorporated databases may be accessed through the AP 100.

Figure 4:
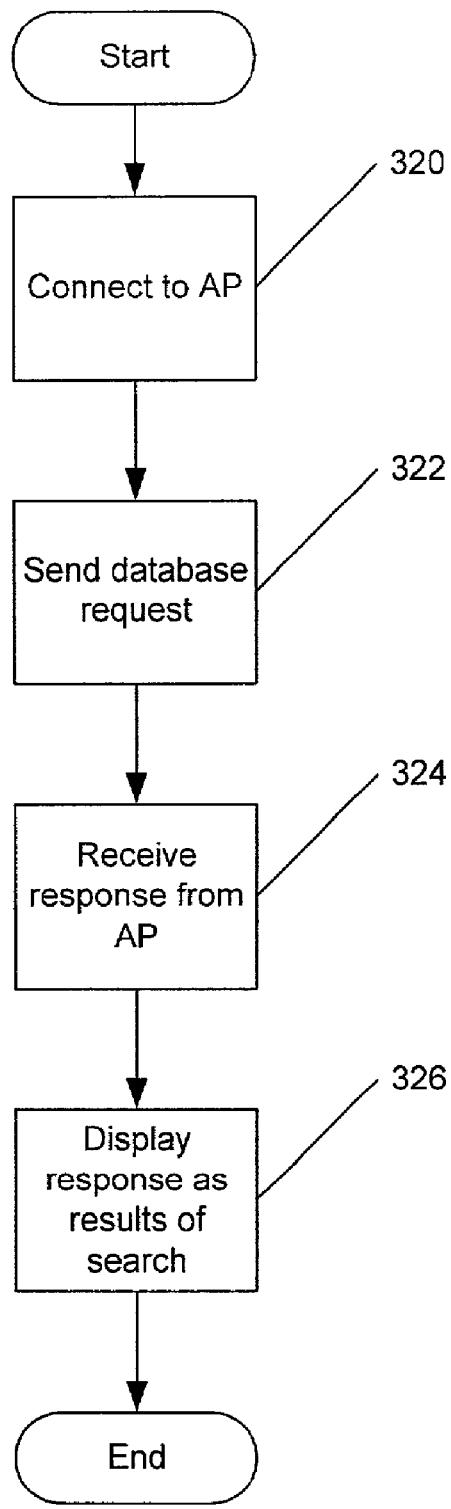
FIG. 4 is a flowchart illustrating operations according to further embodiments of the present invention.

FIG. 4 illustrates operations carried out by the terminal 14 in accessing the AP 100. The terminal 14 connects to the AP 100 (block 320) through, for example, establishing a Wiol window to the AP 100. As described above, such a connection may be a direct connection or over a network. The terminal 14 sends a database request to the AP 100 (block 322), for example, by issuing a COD, POD and/or API command through the Wiol window to invoke a script which searches the databases incorporated into the data provided to the AP 100. The terminal 14 receives the response to the request from the AP 100 (block 324) and displays the response as the results of the search (block 326).

The flowcharts, flow diagrams and block diagrams of FIGS. 2, 3 and 4 illustrate the architecture, functionality, and operation of possible implementations of systems, methods and computer program products for accessing descriptive information associated with a TDMA/GSM switch according to various embodiments of the present invention. In this regard, each block in the flow charts or block diagrams may represent a module, segment, or portion of code, which comprises one or more executable instructions for implementing the specified logical act(s). It should also be noted that, in some alternative implementations, the acts noted in the blocks may occur out of the order noted in the figures. For example, two blocks shown in succession may, in fact, be executed substantially concurrently, or the blocks may sometimes be executed in the reverse order, depending upon the functionality involved.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A method of accessing help information associated with a TDMA/GSM switch having an adjunct processor, the method comprising:
   i. incorporating the help information in data provided to the adjunct processor for controlling the TDMA/GSM switch, wherein the help information provides user-accessible descriptive information regarding the formats of particular commands and/or output data;
   accessing the adjunct processor to access the TDMA/GSM switch; and
   accessing the adjunct processor to access the help information incorporated in the data provided to the adjunct processor.

2. The method of claim 1, further comprising selecting a portion of a database incorporated in the data provided to the adjunct processor based on the data provided to the adjunct processor to control the TDMA/GSM switch.

3. The method of claim 2, wherein the portion of the database comprises selected ones of a plurality of ALEXserv databases.

4. The method of claim 2, wherein selecting the portion of the database incorporated in the data provided to the adjunct processor based on the data provided to the adjunct processor to control the TDMA/GSM switch, comprises:
   selecting a first database associated with central function commands; and
   selecting a second database associated with base station and switch commands associated with the TDMA/GSM switch.

5. The method of claim 1, wherein accessing the adjunct processor to access the TDMA/GSM switch and accessing the adjunct processor to access the portion of the database of help information incorporated in the data provided to the adjunct processor are carried out in a single window of a terminal.

6. The method of claim 1, wherein accessing the adjunct processor to access the portion of the database of help information incorporated in the data provided to the adjunct processor comprise accessing the portion of the database of help information utilizing command line commands.

7. The method of claim 6, wherein the command line commands comprise at least one of a code description command and/or a print description command.

8. The method of claim 1, wherein accessing the adjunct processor to access the portion of the database of help information incorporated in the data provided to the adjunct processor comprises accessing the portion of the database of help information utilizing a graphic user interface.

9. An adjunct processor of a TDMA/GSM switch, comprising:
   data provided to the adjunct processor to control the TDMA/GSM switch; and
   at least a portion of a database of help information associated with the TDMA/GSM switch and incorporated in the data provided to the adjunct processor to control the TDMA/GSM switch, wherein the help information provides user-accessible descriptive information regarding the formats of particular commands and/or output data.

10. The adjunct processor of claim 9, wherein the at least a portion of a database of help information comprises a portion of the database of help information corresponding to the data provided to the adjunct processor to control the TDMA/GSM switch.

11. The adjunct processor of claim 10, wherein the portion of the database comprises selected ones of a plurality of ALEXserv databases.

12. The adjunct processor of claim 10, wherein the portion of the database, comprises:
   a first database associated with central function commands; and a second database associated with base station and switch commands associated with the TDMA/GSM switch.

13. A system for accessing help information associated with a TDMA/GSM switch having an adjunct processor, the method comprising:
   means for incorporating at least a portion of a database of descriptive information with data provided to the adjunct processor to control the TDMA/GSM switch;
   means for accessing the adjunct processor to access the TDMA/GSM switch; and
   means for accessing the adjunct processor to access the portion of the database of descriptive information incorporated in the data provided to the adjunct processor,
   wherein the help information provides user-accessible descriptive information regarding the formats of particular commands and/or output data.

14. The system of claim 13, further comprising means for selecting the portion of the database of help information incorporated in the data provided to the adjunct processor based on the data provided to the adjunct processor to control the TDMA/GSM switch.

15. The system of claim 13, wherein the portion of the database of help information comprises selected ones of a plurality of ALEXserv databases.

16. The system of claim 13, wherein the portion of the database of help information incorporated in the data provided to the adjunct processor to control the TDMA/GSM switch, comprises:
   a first database associated with central function commands; and
   a second database associated with base station and switch commands associated with the TDMA/GSM switch.

17. The system of claim 13, wherein the means for accessing the adjunct processor to access the TDMA/GSM switch and the means for accessing the adjunct processor to access the portion of the database of help information incorporated in the data provided to the adjunct processor comprises a single window of a terminal.

18. The system of claim 13, wherein the means for accessing the adjunct processor to access the portion of the database of help information incorporated in the data provided to the adjunct processor comprises means for accessing the portion of the database of help information utilizing command line commands.

19. The system of claim 18, wherein the command line commands comprise at least one of a code description command and/or a print description command.

20. The system of claim 13, wherein the means for accessing the adjunct processor to access the portion of the database of help information incorporated in the data provided to the adjunct processor comprises means for accessing the portion of the database of help information utilizing a graphic user interface.

* * * * *